Dec. 18, 1951 C. W. MUSSER 2,578,728
SEALING AND TESTING OF TUBES BY
HYDRAULIC PNEUMATIC MEANS
Filed March 18, 1949 2 SHEETS—SHEET 1
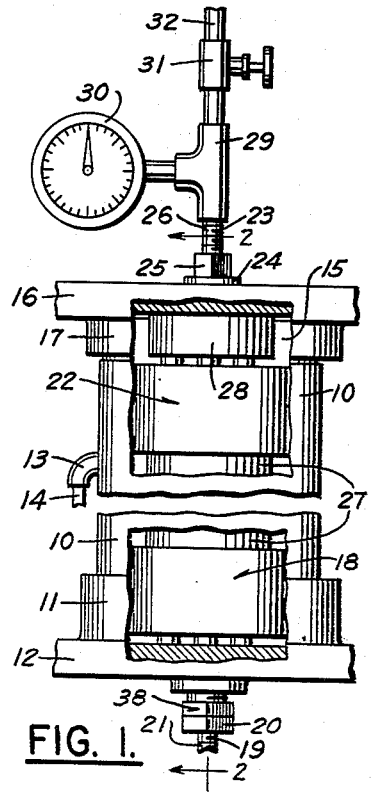
FIG. 1.
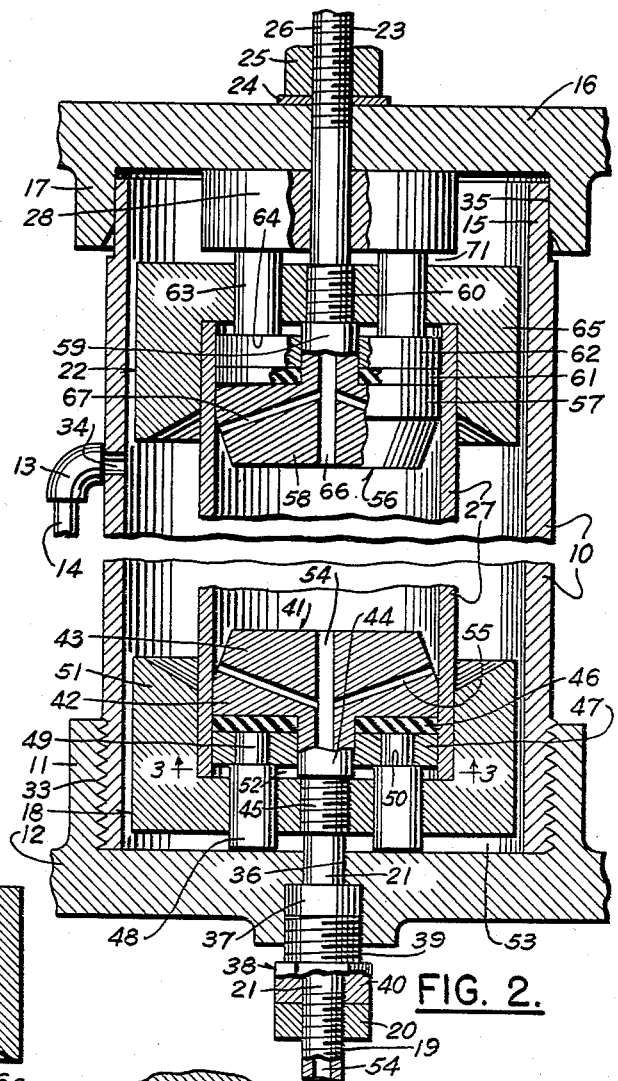
FIG. 2.
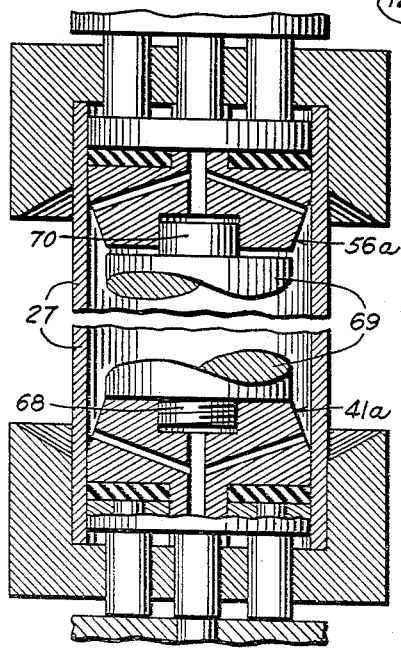
FIG. 3.
FIG. 4.
INVENTOR.
C. WALTON MUSSER.
BY
G. J. Kesserich & J. H. Church
ATTORNEYS

Patented Dec. 18, 1951

2,578,728

UNITED STATES PATENT OFFICE 2,578,728

SEALING AND TESTING OF TUBES BY HYDRAULIC OR PNEUMATIC MEANS

Clarence Walton Musser, Glenside, Pa.

Application March 18, 1949, Serial No. 82,262

7 Claims. (Cl. 73—37)

(Granted under the act of March 3, 1883, as amended April 30, 1928; 370 O. G. 757)

The invention described in the specification and claims may be manufactured and used by or for the Government for governmental purposes without the payment to me of any royalty thereon.

My invention relates broadly to sealing and to hydraulic or pneumatic testing of hollow objects having one or more openings thereinto; and, while not necessarily restricted thereto, has particular reference to the sealing and subsequent testing of tubes to determine their resistance to a bursting pressure applied from within.

For illustrative purposes only, and in no way to limit or restrict the application of my invention, this disclosure will pertain to a piece of metal tubing open at opposite ends. The tube is to be sealed, using my unique inventive means, yet providing for the subsequent testing of its resistance to a bursting pressure applied by a force pump 73 and transmitted within the tube by a hydraulic medium (not shown).

One object of my invention is to provide improved means for quickly and effectively sealing a tube by making use of the pressure employed to test the tube's resistance to bursting.

Another object is to provide a means of testing tubes which gives a more accurate, reliable indication of the actual physical properties of the tube.

A further object is to provide a means of testing tubes which eliminates the longitudinal compressive stress heretofore used in sealing the tube to be tested.

A still further object is to provide a means of reducing the amount of time required for each test by eliminating the necessity of pumping the testing medium back and forth into and out of the tube to be tested.

Yet another object is to provide a means of reducing the volume of hydraulic testing medium required for each test.

The foregoing and other objects of my inventive method and apparatus will become apparent from an inspection of the following specification and accompanying drawings wherein:

Fig. 1 is a side view, partly in section, of my unique invention showing some of the main elements thereof in the "closed" position, ready for the test.

Fig. 2 is a longitudinal section taken along line 2—2 of Fig. 1.

Fig. 3 is a transverse section taken along line 3—3 of Fig. 2.

Fig. 4 is a longitudinal section, similar to Fig. 2, and showing how my invention can be modified so as to further reduce the amount of time and the volume of fluid required for each test.

Figure 5:
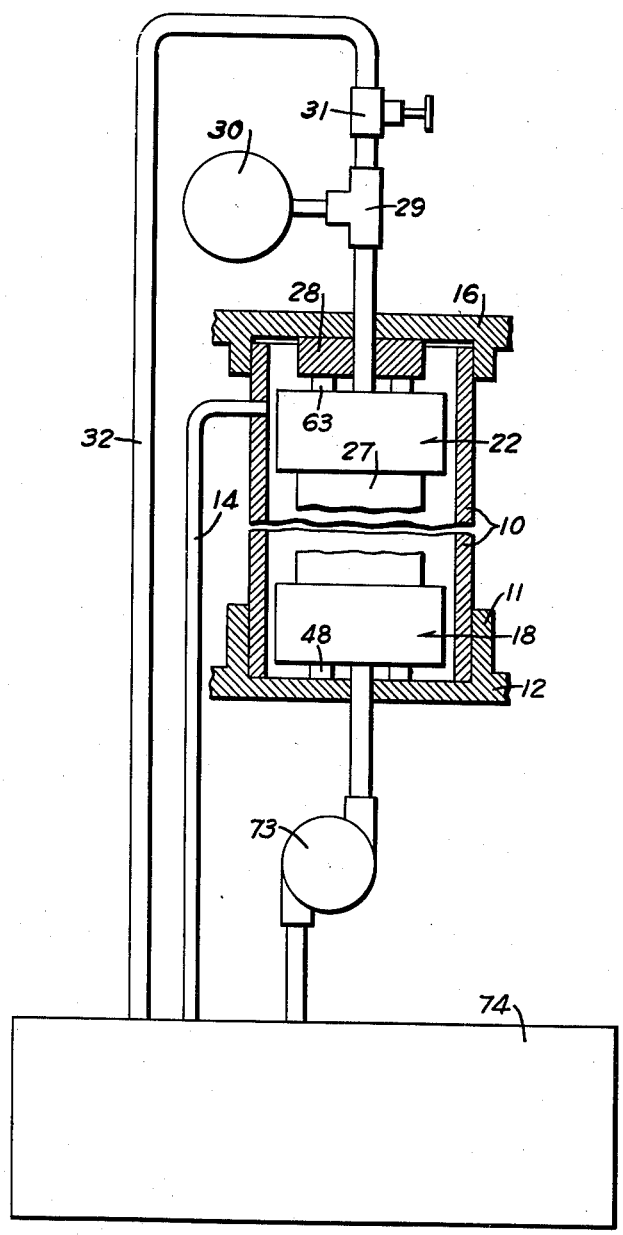
Fig. 5 is a schematic representation of my invention including not only the tube testing device proper but also a reservoir for the testing fluid and a pumping system for injecting and withdrawing the fluid from the tube.

From Fig. 1 my invention is seen essentially to consist of a hollow cylindrical test chamber 10 which is securely mounted in a circular lug 11 protruding from a rigidly fixed base 12. Integrally attached and leading from the inside of the test chamber 10 to a force pump 73 or pump reservoir 74 is one of a plurality of overflow fittings 13 and attached pipe 14. The upper, open end 15 of test chamber 10 is capped by a reciprocally sliding cover 16 having lug 17 especially recessed for sliding contact with the upper end 15 of test chamber 10. A lower tube supporting and sealing means 18 is mounted essentially concentric to the test chamber 10 in the fixed base 12 by means of threads 19 and nut 20 on lower stem 21. An upper tube supporting and sealing means 22 is similarly mounted in the sliding cover 16 by means of threads 23, washer 24, and nut 25 on upper stem 26. Resting between the upper and lower tube supporting and sealing members 22 and 18 is the metal tubing 27 which is to be hydraulically tested for resistance to a bursting pressure.

Interposed between the upper tube supporting and sealing member 22 and the reciprocally sliding cover 16 is an adapter 28 which is slidably mounted on stem 26. By using various adapters, it is possible to accommodate for testing different tubes having like inside diameter but different lengths.

Mounted atop stem 26 are T fitting 29, pressure registering gauge 30, and bleeder valve 31 followed by flexible hose 32 which leads any fluid (not shown) bled through the valve back to a pump or pump reservoir 74. More explicit information concerning these parts will be disclosed later.

In my novel apparatus, hollow lower stem 21 is connected to the outlet of a force pump 73 permitting the hydraulic testing medium (not shown) to be injected inside the tube 27 to be tested. Conversely, the hollow upper stem 26 provides a means, which leads back to the force pump 73 or the pump reservoir 74, of venting the apparatus.

The more detailed structure of my unique means of sealing and testing tube 27 is clearly shown closed and ready for operation in Fig. 2.

There it can be seen that hollow cylindrical test chamber 10 is threadedly attached as indicated at 33 to lug 11 of fixed base 12. Located near the upper open end 15 of test chamber 10 is shown one of a number of overflow holes 34, communicating with fitting 13 and pipe 14. The upper open end 15 of test chamber 10 is shown slidably accommodated in the recess 35 of lug 17 in reciprocally sliding cover 16.

Essentially concentric to the hollow cylindrical test chamber 10, fixed base 12 contains an opening 36 to slidably accommodate lower stem 21 and a larger threaded opening to receive packing 37 and packing retainer 38. The retainer 38 has a threaded body portion 39, an expanded head portion 40, and a central opening therethrough which permits the retainer to be fitted onto lower stem 21.

The lower tube supporting and sealing means 18, located essentially concentrically within the hollow cylindrical test chamber 10, consists of a plug member 41 having a cylindrical portion 42 of slightly less diameter than the inside of the tube 27 to be tested, and a truncated conical nose portion 43. Extending from the end of the cylindrical portion 42 of plug member 41, away from the truncated portion 43, are a neck portion 44, a threaded shank portion 45 and the stem portion 21.

Neck portion 44 accommodates a resilient sealing element 46 having a convenient central opening and an outside diameter, when free of stress, slightly less than the inside diameter of the tube 27 to be tested. Neck portion 44, in addition, slidably fits into a central opening in a back-up plate 47 whose outside diameter is also slightly less than the inside diameter of the tube 27. A plurality of posts 48 having a portion of reduced diameter 49 and a shoulder 50 are securely pressed up to the shoulder 50 into convenient openings in the back-up plate 47.

By design, the total surface area of the truncated conical nose portion 43 is greater than the "face" area of the sealing element 46 (i. e. the area of the surface which contacts the base of nose portion 43) by a certain amount in order to accomplish one of the main features of my invention as will later be revealed.

A cuplike tube supporting member 51, having a beveled mouth recess to slidably accommodate the outside diameter of the tube 27 to be tested, is secured to the shank 45 of plug member 41 by means of the threads of each member and is provided with convenient openings through which posts 48 pass.

As seen from the Fig. 2 relationships, the length of the neck portion 44 is substantially greater than the combined thickness of the unstressed sealing element 46, and the back-up plate 47 in order to provide an appreciable space 52 between the back-up plate and the bottom of the tube accommodating recess. In addition, the length of the posts 48 below the shoulder 50 is greater than the thickness at the bottom of the tube accommodating recess in cuplike member 51 in order to provide an ample space 53 between the bottom of that member and the bottom test chamber recess in lug 11.

A central opening 54 communicating with one or more lateral openings 55 is contained in the plug member 41 and serves as a means of passing the hydraulic testing medium (not shown) from the force pump 73 to the inside of the tube 27 to be tested, or vice versa.

In summary, the assembled lower tube supporting and sealing unit then consists of plug member 41, resilient sealing element 46, back-up plate 47, posts 48, and cuplike member 51, and is held in place in the fixed base 12 by means of threads 19 and nut 20 on stem 21. Nut 20 is turned enough just to avoid stressing the sealing element 46. It will be noted from Fig. 2 that posts 48 rests on the fixed base 12 at the bottom of the test chamber recess.

It will be noted from the drawings that the upper tube supporting and sealing means 22 is of a construction identical with the lower tube supporting and sealing means 41. However, since the upper tube supporting and sealing unit 22 moves with the cover 16, while the lower tube supporting and sealing unit 18 remains stationary in the fixed base 12, and since there is a slight difference in the mounting of the unit, confusion will hereinafter be avoided by independently referring to the various parts of the upper tube supporting and sealing unit 22; the following reference characters will, therefore, be used: upper plug member 56 having cylindrical portion 57, truncated conical nose portion 58, neck portion 59, threaded shank portion 60, and stem portion 26. Neck portion 59 accommodates resilient sealing element 61 and back-up plate 62; back-up plate 62 contans posts 63 having a shoulder 64 and a portion of reduced diameter (not shown), and cup-like tube supporting and sealing member 65. The upper plug member 56 has a central opening 66 and lateral openings 67.

All statements made about the various parts of the lower tube supporting and sealing means will apply to the corresponding parts of the upper tube supporting and sealing means with the exception that central opening 66 and lateral openings 67 provide a means of venting the apparatus. Posts 63 rest in light contact with the adapter 28 leaving the space 71 therebetween, the upper tube supporting and sealing unit 22 is attached to cover 16 by means of upper stem 26 extending through an opening in adapter 28, and secured to the cover by means of threads 23, washer 24, and nut 25. The nut 25 is turned enough to just avoid stressing the sealing element 61.

Figs. 1–2 described thus far refer to my invention in the "closed" position ready for testing the tube 27, although the hydraulic medium used is not shown. In describing the practice of my invention it will be expedient to commence with the apparatus in the "open" position, and to assume that tube 27 has not yet been positioned within the test chamber 10.

As can easily be construed from the drawings and description thus far presented, when the apparatus is in the "open" position the cover 16, with its appended adapter 28, upper tube supporting and sealing unit 22 and other parts, has been axially separated from open end 15 of the test chamber 10 by automatic means (not shown). The amount of separation will depend upon the length of the tube 27 to be tested and need be only sufficient to provide space for insertion of the tube within the test chamber 10. Bleeder valve 31 has been automatically opened (by means not shown). The lower tube supporting and sealing unit 18 remains attached to the fixed base 12.

With the apparatus in the "open" position, tube 27 is introduced through the open end 15 of test chamber 10 and is placed into the lower cup-like tube support member 51. By automatic means (not shown) reciprocally sliding cover 16, with its attached parts, is returned to its Fig. 1 position causing both ends of tube 27 to be initially sealed in the following manner.

Cover 16 is urged toward the fixed base 12 with a certain predetermined force and then locked in this position (by means not shown). A simple illustration of this would be if cover 16 were screwed unto test chamber 10 with a predetermined torque. That pressure is transmitted through adapter 28, posts 63, back-up plate 62, resilient sealing element 61, plug member 56, cup-like member 65, and tube 27, to the lower cup-like member 51. At this lower end the pressure urging the cover 16 toward the base 12 is transmitted through lower cup-like member 51, plug member 41, resilient sealing element 46, back-up plate 47, and posts 48 to the fixed base 12. In consequence of this pressure the upper and lower sealing elements, 61 and 46 respectively, are compressed between their respective adjoining plugs 56 and 41 and back-up plates 62 and 47, and are caused to press radially outward against the inner wall of the tube 27, this causing initial sealing. Cup-like members 51 and 65 meanwhile prevent any distortion of the tube 27.

With bleeder valve 31 still open, a hydraulic pump 73 is caused to inject the testing medium (not shown) into the inside of the tube through the central and lateral openings 54 and 55 respectively. As the level of the fluid rises, air within the tube is vented off by means of lateral openings 67 which communicate with the central opening 66, and escape past the bleeder valve 31.

When the level of the hydraulic testing medium reaches the bleeder valve 31, all air within the tube has been displaced and the bleeder valve is then closed, manually or automatically as desired. At this point, pressure begins to build up within the tube 27, the amount of pressure registering on gauge 30.

As the pressure within tube 27 increases, it tends to move upper and lower plug members 56 and 41 apart. This results in a further compression of the sealing elements 61 and 46 causing them to contact the inside wall of the tube 27 more forcefully. Therefore, as the test pressure increases, the sealing pressure of the elements 61 and 46 also increases because of the fact that, since the surface area of each nose portion (58 and 43, respectively) exceeds the "face" area occupied by each sealing element, the unit pressure on the sealing elements is greater than the unit test pressure. The elements 61 and 46 are therefore self-sealing.

As the pressure within the tube 27 increases it also tends to cause upper and lower cup-like members 65 and 51 to move apart in the corresponding spaces 71 and 53 provided therefor, thus relieving the initial compressive stress placed upon the tube by the action of cover 16. The test will then be conducted without any appreciable longitudinal compressive stress which, if present, would complicate the analysis of the bursting strength.

When the desired test pressure, as registered on gauge 30, is reached, the pressure is stabilized (by means not shown) for the required amount of time. If the tube 27 being tested sustains the test pressure for the predetermined length of time, the tube is assumed to have sufficient resistance against bursting causable by pressure. If the wall of the tube ruptures or deforms under the test pressure, of course the tube will be rejected as not having sufficient resistance to the bursting pressure.

In either case, the test is complete and the tube must then be removed from the test chamber 10. To do this, the test pressure exerted by a force pump 73 is removed, but the hydraulic testing medium is permitted to remain within the tube 27. Bleeder valve 31 is automatically opened (by means not shown) and cover 16 carrying the attached adapter 28 and upper tube supporting and sealing unit 22 is axially removed from atop the test chamber 10 (by means not shown) a sufficient amount to allow the tube 27 to be extracted from the test chamber 10.

As tube 27 is extracted from test chamber 10 the hydraulic testing fluid (not shown) within tube 27 is permitted to run into the surrounding test chamber. The capacity of the test chamber 10 is determined by the location of the overflow holes 34 (one of which is shown in Fig. 2) which are so located that, when the next tube to be tested is positioned, it will already be very substantially, if not completely, filled with the hydraulic testing medium and it will only be necessary for the force pump 73 to apply the test pressure or to deliver a very small additional quantity of the testing medium.

An alternative to allowing the test chamber 10 to fill gradually after each test is to pump the hydraulic medium (not shown) into the test chamber 10 to the level of the overflow holes before the first test is made. Once the chamber 10 is capacitated, any excess will pass through holes 34, fittings 13 and pipes 14 back to the pump 73 or pump reservoir 74.

It can be easily seen that not having to supply anything except, at the most, very small quantities of testing medium, would result in a great saving of time, especially where large voluminous tubes were to be tested.

Prior to my invention, it was customary, in a test of this kind, to seal the tube by applying a longitudinal pressure to some type of sealing arrangement placed over the ends of the tube. The ends of the tube had to be reasonably perpendicular to the tube's axis and the sealing pressure used, which generally was greatly in excess of the maximum available test pressure, resulted in the tube's being subjected to a longitudinal compressive stress. Moreover, this stress was present all during the test.

With my novel means, however, the tube 27 is not subjected to a compressive stress during the test, the tube ends need not be perpendicular to the tube's axis, and the sealing pressure of the elements 61 and 46 against the tube's wall is created solely by the test pressure.

In hydraulically testing objects having only one opening into the interior, the inlet and vent openings 54 and 66 respectively can be conveniently located in the one required plug member, preferably located at the highest possible point so as to avoid trapping air, which however would not influence the test pressure reading on gauge 30.

Another method of reducing the amount of time required for making each test and also of reducing the volume of hydraulic medium required is exemplified in Fig. 4. Here the lower plug member 41a is recessed and threaded to receive the threaded end 68 of a mandrel 69. The upper plug member 56a is similarly recessed to slidably accommodate the opposite end 70 of the mandrel. The diameter and length of the mandrel 69 are such as substantially to fill the inside of the tube 27 to be tested. It is easily apparent that a very great reduction in the volume of testing fluid required would result from the adaption of this modification, and that a great saving of time and energy would consequently follow.

From the foregoing it will be seen that I have provided an improved means for quickly and effectively sealing a tube by making use of the pressure employed to test the tube's resistance to bursting; that I have provided a means of testing tubes which gives a more accurate, reliable indication of the actual physical properties of the tube; that I have provided a means of testing tubes which eliminates the longitudinal compressive stress heretofore used in sealing the tube to be tested; that I have provided a means of reducing the amount of time required for each test by eliminating the necessity of pumping the testing medium back and forth into and out of the tube to be tested; and that I have provided a means of reducing the volume of hydraulic medium required for each test.

With possible minor changes that will not depart from the spirit and intent of my invention, the means of sealing and testing of tubes here discussed can be used to seal and test practically any type of hollow object. In addition, an alternative technique to the hydraulic sealing and testing procedure set forth above will be to employ the apparatus for pneumatically sealing and testing tubes. My inventive means are therefore extensive in their adaption, and are not to be restricted to the specific form here disclosed by way of illustration.

I claim:

1. In apparatus of the character described, the combination of a tank open at one end, a fluid-inlet member extending through the closed tank end, a reservoir for containing a hydraulic testing fluid, a pump connected between said reservoir and said fluid-inlet member, an overflow duct leading from within the tank to said reservoir, a first cup-shaped tube supporting means secured for limited longitudinal movement within said tank adjacent the tank's closed end, a first plug filling one end of the tube to be tested and comprised of a nose portion backed up by a resilient sealing member and a non-yieldable back-up plate, first rigid means for spacing said first plug's back-up plate from said tank's closed end, a cover secured to said tank's open end, a second cup-shaped tube supporting means secured to said cover for limited longitudinal movement with respect thereto, a second plug filling the end of the tube to be tested opposite to that filled by said first plug and comprised of a nose portion backed up by a resilient sealing member and a non-yieldable back-up plate, second rigid means for spacing said second plug's back-up plate from said cover whereby the pressure within the tube to be tested can be increased to cause the resilient sealing members to seal both tube ends and also move said first and second tube supporting means free of the tube ends so as to relieve them of any external compressive stress during the test.

2. In the apparatus of claim 1, the first plug having a mandrel threadedly secured thereto for extending into the tube being tested, whereby to occupy a considerable volume of the tube's interior and thereby to diminish the volume of testing fluid necessary to fill the tube in transmitting a testing pressure to the tube's sidewalls.

3. In the apparatus of claim 1, a mandrel positioned in the tube being tested, whereby to occupy a considerable volume of the tube's interior and thereby to diminish the volume of testing fluid necessary to fill the tube in transmitting a testing pressure to the tube's sidewalls.

4. In the apparatus of claim 1, the first plug having a mandrel threadedly secured at one end thereto for extending into the tube being tested, and the second plug having a recess for accommodating the free end of said mandrel, whereby the mandrel is supported in a substantially rigid manner within the tube being tested thus occupying a portion of the tube's internal volume and thereby diminishing the volume of testing fluid necessary to fill the tube in transmitting a testing pressure to the tube's sidewalls.

5. In apparatus for sealing and hydraulically testing the resistance of tubes and the like to internally applied pressure, the combination of first and second cup-shaped means for snugly encircling and supporting the ends of the tube being tested but capable of divergent longitudinal movement therefrom during the testing process, first and second plugs filling the respective tube ends, first and second resilient tube-sealing means each backing up the corresponding one of said plugs on the sides facing the respective tube ends, unyielding first and second stress-resisting means each backing up the corresponding one of said resilient sealing means, unyielding first and second fixtures respectively supporting said stress-resisting means in position to prevent longitudinal movement of the sealing means in the direction of the respective supporting fixtures, a pump, fluid inlet means leading from said pump through said first tube supporting means and said first plug into the tube being tested, air venting means leading from the tube's interior through said second plug and said second tube supporting means, a bleeder valve attached to said air venting means, and a pressure gauge connected to said air venting means before said bleeder valve, whereby the pressure within the tube being tested can be increased so as to compress said first and second resilient means and force them radially against the tube's interior walls and simultaneously to diverge the said first and second tube supporting means free of contact with the tube ends 6. In apparatus for sealing and hydraulically testing the resistance of tubes and the like to internally applied bursting pressure, the combination of a base, a test chamber secured at one end in fluid-tight relationship to said base, fluid-conducting means having one end extending into the chamber through a mating opening in the latter's closed end, a first tube supporting means mounted adjacent said base for limited axial movement relative to said chamber, a first plug having a cylindrical cross section dimensioned so as substantially to fill the first end of the tube being tested, a first circular resilient sealing member whose normal diameter substantially equals that of said first plug and which is mounted adjacent the end of said plug nearest said base, first stress resisting means fixedly extending between said base and said first sealing member, a removable cover for closing the end of said chamber opposite to said base, a second tube supporting means mounted adjacent said cover for limited axial movement relative to said chamber, a second plug having a cylindrical cross section dimensioned so as substantially to fill the second end of the tube being tested, a second circular resilient sealing member whose normal diameter substantially equals that of said second plug and which is mounted adjacent the end of said plug nearest said cover, and second stress resisting means fixedly extending between said cover and said second sealing member, whereby said first and second tube supporting means secure the ends of the tube while the inside pressure thereof is being built up by admission of fluid thereinto so as to compress said sealing members into fluid-tight relationship with said tube's inner wall, but as the proper tube testing pressure is approached said tube supporting means are diverged from the tube ends so as to relieve the tube from any longitudinal compressive stress during the actual tube-testing operation.

7. In apparatus of the character described, the combination of a tube-testing chamber having one end closed substantially fluid-tight but open at its other end, fluid-conducting means having one end extending into the chamber through a mating opening in the latter's closed end, a reservoir for containing a testing fluid, a pump connected to said reservoir and to said fluid-conducting means for pumping the testing fluid from the reservoir into the chamber, an overflow duct connecting at one end with an opening in the chamber's sidewall and at the other end emptying into said reservoir, a first tube supporting means mounted adjacent the chamber's closed end for limited axial movement relative to said chamber, a first plug having a cylindrical cross section dimensioned so as substantially to fill the first end of the tube being tested, a first circular resilient sealing member whose normal diameter substantially equals that of said first plug and which is mounted adjacent the end of said plug nearest the first end of said tube, first stress resisting means fixedly extending between said base and said first sealing member, a removable cover for closing the end of said chamber opposite to said base, a second tube supporting means adjacent said cover for limited axial movement relative to said chamber, a second plug having a cylindrical cross section dimensioned so as substantially to fill the second end of the tube being tested, a second circular resilient sealing member whose normal diameter substantially equals that of said second plug and which is mounted adjacent the end of said plug nearest the second end of said tube, second stress resisting means fixedly extending between said cover and said second sealing member, an air-venting pipe extending through a mating opening in said cover and connecting with channels extending through said second plug, a bleeder valve attached to said pipe, and a pressure gauge connected to said pipe between the cover and the bleeder valve, whereby said first and second tube supporting means secure the ends of the tube while the inside pressure thereof is being built up by admission of hydraulic fluid thereinto so as to compress said sealing members into fluid tight relationship with said tube's inner wall, but as the proper tube testing pressure is approached said tube supporting means are diverged from the tube ends so as to relieve the tube from any longitudinal compressive stress during the actual tube-testing operation.

CLARENCE WALTON MUSSER.

REFERENCES CITED

The following references are of record in the file of this patent:

UNITED STATES PATENTS

| Number | Name | Date |
| --- | --- | --- |
| 1,118,478 | Dixon | Nov. 24, 1914 |
| 1,734,805 | Hawthorne | Nov. 5, 1929 |
| 1,841,974 | Naylor | Jan. 19, 1932 |
| 2,445,876 | Fullerton | July 27, 1948 |

FOREIGN PATENTS

| Number | Country | Date |
| --- | --- | --- |
| 551,566 | Great Britain | Mar. 1, 1943 |